US010725447B2

(12) United States Patent
Morneau et al.

(10) Patent No.: US 10,725,447 B2
(45) Date of Patent: Jul. 28, 2020

(54) METHOD FOR AUTOMATED STRAIGHTENING OF WELDED ASSEMBLIES (71) Applicant: Bombardier Transportation GmbH, Berlin (DE)

(72) Inventors: Gaston Morneau, La Pocatiere (CA); Gabriel Caron-Guillemette, St-Jean-Port-Joli (CA); Frédéric Allard, Caplan (CA)

(73) Assignee: Bombardier Transportation GmbH, Berlin (DE)

(*) Notice: Subject to any disclaimer, the term of this patent is extended or adjusted under 35 U.S.C. 154(b) by 67 days.

(21) Appl. No.: 16/169,224

(22) Filed: Oct. 24, 2018

(65) Prior Publication Data

US 2019/0163162 A1 May 30, 2019

(30) Foreign Application Priority Data

Nov. 24, 2017 (CA) ..................................... 2986676

(51) Int. Cl.
*G05B 19/404* (2006.01)
*G05B 19/401* (2006.01)
*B23K 26/03* (2006.01)
*B23K 26/32* (2014.01)
*B23K 31/00* (2006.01)
*B23K 26/21* (2014.01)
(Continued)

(52) U.S. Cl.
CPC ............ *G05B 19/404* (2013.01); *B21D 1/00* (2013.01); *B21D 3/00* (2013.01); *B23K 26/032* (2013.01);
(Continued)

(58) Field of Classification Search
CPC . B21D 1/00; B21D 3/00; B21D 11/20; B23K 26/032; B23K 26/21; B23K 26/32;
(Continued)

(56) References Cited

U.S. PATENT DOCUMENTS

| 4,425,776 A | 1/1984 | Judge, Jr. | |
| 6,385,556 B1 * | 5/2002 | Kawano | B21D 11/20 702/155 |

(Continued)

FOREIGN PATENT DOCUMENTS

| CN | 202523112 U | * 11/2012 |
| CN | 103752651 B | 9/2015 |

(Continued)

OTHER PUBLICATIONS

Quick Start Guideline for Benchwork, Youjun Hao, p. 141-143, National Defense Industry Press, Apr. 30, 2007.

*Primary Examiner* — Mekonen T Bekele
(74) *Attorney, Agent, or Firm* — The Webb Law Firm (57) ABSTRACT

An automated method for straightening/correcting deformations made to panels when welded to metallic structural components is disclosed. In the train industry, when an aluminum component, such as a vehicle's exterior shell, is welded to hidden structural parts, deformations thereon may occur. Such deformations need to be subsequently corrected, and the present method uses robots and optical measuring of the deformed surfaces to conduct a straightening thereof. The method includes four main steps. First, the deformed surface is scanned with an optical sensor to make physical measures/characterizations thereof. Second, the gathered data are compared with the desired resultant by a software. Third, once the comparison is done, the software performs an analysis to select the proper parameters to be used in the straightening method that will be applied at each area requiring straightening. Finally, a robot executes the operations specified by the software to perform the straightening process.

16 Claims, 5 Drawing Sheets (51) Int. Cl.
*B23K 26/70* (2014.01)
*B23K 26/352* (2014.01)
*B21D 1/00* (2006.01)
*B21D 3/00* (2006.01)
*B23Q 17/20* (2006.01)
*B23K 103/04* (2006.01)
*B23K 103/10* (2006.01)
*B21D 11/20* (2006.01)

(52) U.S. Cl.
CPC .............. *B23K 26/21* (2015.10); *B23K 26/32* (2013.01); *B23K 26/352* (2015.10); *B23K 26/70* (2015.10); *B23K 31/003* (2013.01); *B23Q 17/20* (2013.01); *G05B 19/401* (2013.01); *B21D 11/20* (2013.01); *B23K 2103/04* (2018.08); *B23K 2103/10* (2018.08); *G05B 2219/37197* (2013.01); *G05B 2219/45104* (2013.01)

(58) Field of Classification Search
CPC .... B23K 26/352; B23K 26/70; B23K 31/003; B23K 2103/04; B23K 2103/10; B23Q 17/20; G05B 19/401; G05B 19/404; G05B 2219/37197; G05B 2219/45104
See application file for complete search history.

(56) References Cited

U.S. PATENT DOCUMENTS

| | | | |
|---|---|---|---|
| 6,438,442 | B1 | 8/2002 | Guericke et al. |
| 7,431,780 | B2 | 10/2008 | Myhr et al. |
| 9,827,633 | B2 * | 11/2017 | Schmit .................... B23K 26/32 |
| 2002/0043092 | A1 * | 4/2002 | Jones ....................... B21D 11/10 72/342.1 |
| 2004/0237622 | A1 * | 12/2004 | Myhr ....................... B21D 3/00 72/342.94 |
| 2009/0045243 | A1 * | 2/2009 | Young ................... B23K 11/0073 228/13 |
| 2014/0088765 | A1 * | 3/2014 | Valpola .................. B25J 9/1697 700/259 |
| 2015/0367377 | A1 * | 12/2015 | Negri ......................... C09J 5/00 427/207.1 |
| 2016/0016255 | A1 | 1/2016 | Bruck et al. |

FOREIGN PATENT DOCUMENTS

| | | | | |
|---|---|---|---|---|
| CN | 107008996 A | * | 8/2017 | |
| DE | 19804577 A1 | * | 8/1999 | ........... B23K 26/032 |
| DE | 19804577 A1 | | 8/1999 | |
| DE | 102008003882 A1 | | 7/2009 | |
| EP | 1423218 A1 | | 6/2004 | |

* cited by examiner

METHOD FOR AUTOMATED STRAIGHTENING OF WELDED ASSEMBLIES

CROSS-REFERENCE TO RELATED APPLICATION

This application claims priority to Canadian Patent Application No. 2,986,676 filed Nov. 24, 2017, the disclosure of which is hereby incorporated by reference in its entirety.

FIELD

The present subject-matter relates to welded assemblies and, more particularly, to the correction of deformations defined in sub-assemblies, e.g. panels, of such welded assemblies.

BACKGROUND

When metallic panels are welded on supporting structural elements, it is well known that this may cause deformations in the panels. For instance, such panels, which can be outside body panels of vehicles, are relatively thin. When subjected to the heat required for welding the panels to supporting structural elements located behind them, deformations are generated in the panels. Such deformations can generally be corrected manually, but this has a detrimental effect on the whole cost of the manufacturing process.

U.S. Pat. No. 6,438,442 issued on Aug. 20, 2002 to Guericke et al. and entitled "Method for Automatic Conducting of a Straightening Process" discloses a method for automatically conducting a straightening process for an object to be straightened, such as sheet metal, strips, sections, pipes, and particularly for wire-like or multiwire-like objects, using a straightening device or a levelling machine. The method uses at least one mangle roll which can be adjusted by an actuator. A process simulation model of a straightening process that is to be conducted, and a process simulation program are set up. The process simulation program directly gives "online" the settings of the adjustable mangle rolls. During the straightening process, changes in the product data, in particular in the material characteristics and/or in the dimensions of the objects to be straightened which influence the realization of the straightening process, are recorded. From these, data for setting the adjustable mangle rolls are also calculated, and signals are emitted for the automatic setting of the adjustable mangle rolls using the at least one actuator.

U.S. Pat. No. 4,425,776, issued on Jan. 17, 1984 to Judge, Jr. and entitled "Production Workpiece Straightening System" describes a production system for simultaneously correcting multiple distortions in multiple extensions of an irregular workpiece, such as steering knuckles for automotive vehicles, within tolerance requirements. For each distortion, there is provided a gauge for determining direction and magnitude automatically employed to monitor corrective deflection beyond yield point under an electronic controller program that automatically initiates, controls, and terminates simultaneous corrective deflection in either or both of two planes at each of the multiple workpiece locations. The electronic controller program is adapted to vary with the relative as well as the individual distortions and to update the straightening program with the straightening experience data of each successive workpiece in order to approach an optimum of simultaneous single stroke corrective deflection of the multiple distortions in multiple planes within total workpiece tolerances.

Therefore, it would be desirable to provide an apparatus and/or a process to automate the straightening of welded workpieces.

SUMMARY

It would thus be desirable to provide a novel apparatus and/or process for straightening welded workpieces, such as panels.

The embodiments described herein provide in one aspect an automated method for at least partly straightening deformations in a panel and the like, comprising:

a) scanning a deformed surface of the panel to gather data thereon;

b) comparing the gathered data of step a) with a desired result;

c) performing an analysis of the compared data of step b) for selecting at least one parameter to be used in a surface straightening step; and d) executing on the deformed surface straightening operations dictated by the at least one parameter.

BRIEF DESCRIPTION OF THE DRAWINGS

For a better understanding of the embodiments described herein and to show more clearly how they may be carried into effect, reference will now be made, by way of example only, to the accompanying drawings, which show at least one exemplary embodiment, and in which.

DESCRIPTION OF VARIOUS EMBODIMENTS

It is well known in the manufacturing field, such as in the train manufacturing industry, that welding operations may induce deformations in metallic components (e.g. components made of aluminum, steel, etc.). For example, welding external sub-assemblies of a shell of a rail vehicle, such as panels, to its underlying car body structure subjects those panels to deformations. These deformations need to be subsequently corrected. The deformed shell panels are typically straightened manually, using a flame torch to heat them up and relieve their internal stresses. The straightening process typically consists in heating specific areas of the panels and then rapidly cooling the same with water and/or any other appropriate means constraining the panels by applying force. This way of repairing the panels may however get costly and may yield inconsistent results as it is dependent on the worker's skills level. The present subject-matter may also have applications other than panels, such as any metallic structure or component having undergone a thermal cycle (heating) or having been subjected to external constraints that produce internal constraints that are sufficient to cause the metallic structure to deviate from its nominal shape (and/or dimensions). A welded part will become deformed and can thus be considered to be straightened or corrected using the present method and system. The metallic structure may be made of panels, sheets, extrusions, beams, rolled or formed tubes, etc. There are numerous applications for these metallic structures in many technological fields, such as vehicles, bridge decks, etc. It is noted that, depending on the specific application, an appropriate heat source would be used. It is further noted that the present method would not apply to parts that require to be hammered in order for them to adopt their nominal shape and/or dimensions.

The present subject-matter is thus directed to the straightening of panels, such as vehicle body panels, including panels made of sheet metal (also known as skins) or of the double-sided hollow extrusion type. It also proposes the use of robots (which is understood here to potentially include a robotic arm) and optical measuring of the panel's surfaces to conduct the straightening thereof, as described in more details hereinafter. The same straightening method may potentially be applied to other applications where deformations occur following a manufacturing step, such as after a welding operation. It should be noted that in the present description, the term straightening or straight should be understood as meaning substantially back to its original or originally intended shape, whether a 2D or a 3D shape. Panels may be flat or curved and may have a rectangular or any other geometric or irregular shape required to make up the shell covering the exterior of the vehicle.

Applicant considers that the use of an automated straightening system can reduce the costs and time spent on straightening the external panels of its vehicles by having the automated straightening system automatically generating and applying the straightening procedure based on a digitization of the panels' surfaces. The straightening is then carried out by virtue of laser-created residual stresses on the surface of the panels, these residual stresses opposing the stresses already present as a result of the welding operation. The automation of the process is based on the manipulation of data generated by the 3D digitization of the panels or parts to be straightened.

Figure 1:
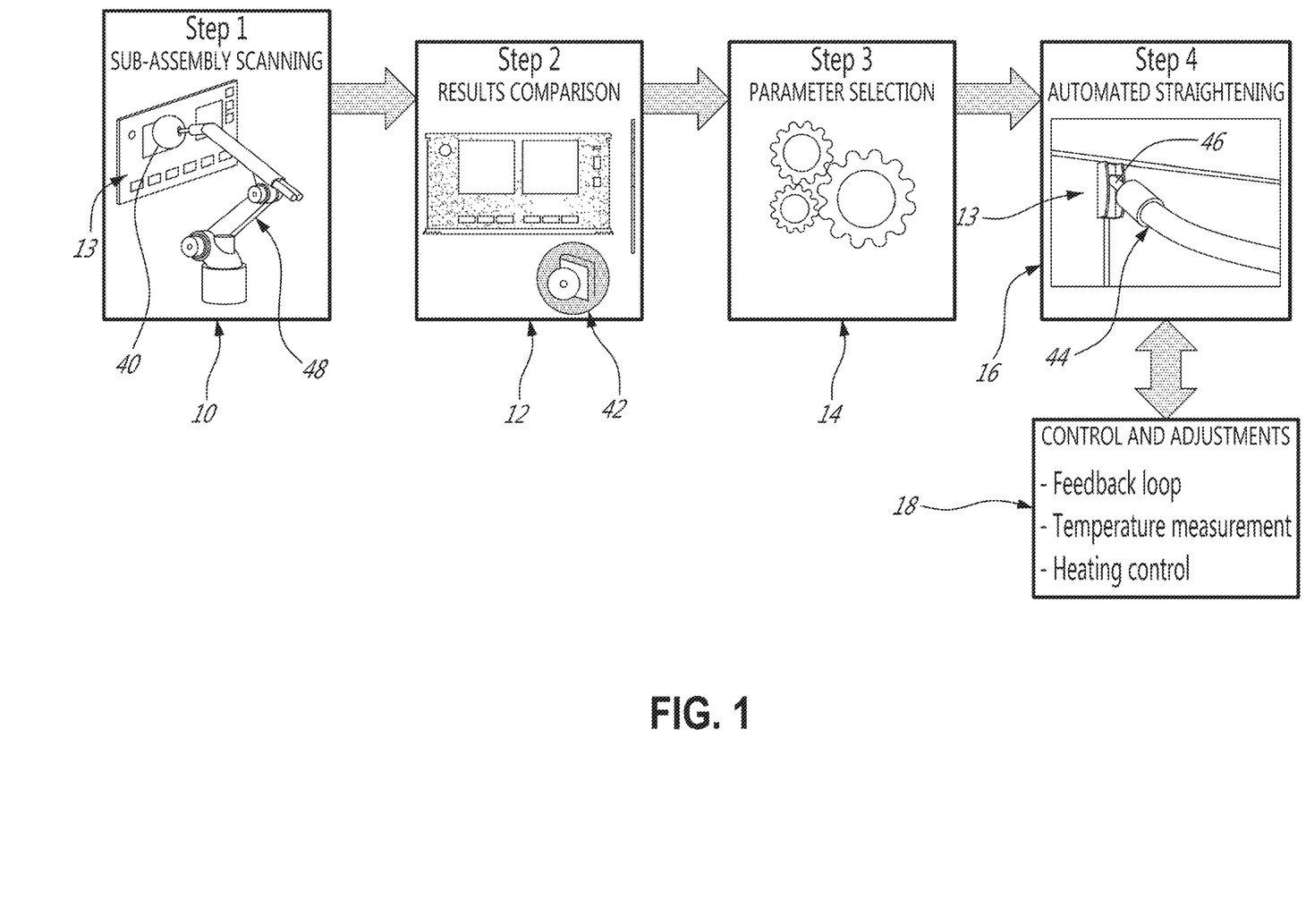
FIG. 1 is a schematic view of a method for straightening deformations in metallic panels in accordance with an exemplary embodiment, which panels were deformed typically during the welding thereof to a structural component.

The present method can, for example, be described in four major steps, as schematically illustrated in FIG. 1. First, a sub-assembly or panel 13 is scanned at a first scanning step 10. Second, the scanning results are compared with reference data at comparing step 12. Third, an analyzing step 14 is conducted to determine and select straightening parameters. Finally, a straightening step 16 is performed to straighten the panel 13. These steps will now be described in more details.

The scanning step 10 is performed using a measurement device (optical, mechanical), such as a 3D scanner. In the present example, the measurement device is an optical sensor 40 that uses, for instance, laser triangulation to make physical measures/characterizations of the panel 13, with photogrammetry being a possible alternative to laser triangulation. Note that a position sensor, such as a Faro arm could also be used, but it usually requires more time to scan the surface. Thus, in the scanning step 10, the optical sensor 40 is used to scan the panel 13 and provide a cloud of data points corresponding to the surface of the panel 13, each point of the cloud of points being defined by its own 3D coordinates (X, Y, Z).

Although the optical sensor 40 may be manually operated, the manipulation of the optical sensor 40 over the surface is preferably automated using a robot 48, typically having a robotic arm, to which is connected the optical sensor 40. The robot 48 is therefore operative to manipulate the optical sensor 40 so as to scan the entirety of the one or many panels 13 making up the vehicle shell. The robot 48 may be fixed to a static base and have a sufficient reach to scan the whole vehicle or it may be fixed on a mobile base which may move along the vehicle. Alternatively, the vehicle may move along a longitudinal axis, for example, and the robot 48 may be fixed on a static base. In any case, the objective is for the optical sensor 40 to be able to completely scan all of the panels of the vehicle shell.

At the comparing step 12, the gathered data is then compared with the desired result (e.g.: tridimensional CAD) by a computer software 42. More particularly, in the comparing step 12, the cloud of points obtained in the scanning step 10 and representing the scanned surface of the panel 13 is compared with a reference surface (which may be a 2D or a 3D CAD model). The comparison is made by comparing, for example, the Z coordinate of the scanned and reference surfaces, assuming that the X and Y coordinates are located in a flat plane of the reference surface. As the Z coordinate represents a height of a point above the reference surface, the deformation is determined by the difference between the scanned Z coordinate and the reference Z coordinate. In other words, for an identical X and Y coordinate, the Z coordinate is compared between the scanned panel surface and the reference surface, such that a deformation of the panel can be determined along the Z axis. This comparison step is performed using a software and computer so that it can be rapidly and accurately performed.

Once the comparing step 12 is completed, a controller, which may use a computer and software 42, performs an analysis at the analyzing step 14 to select or define the proper parameters to be used for the upcoming straightening procedure of the straightening step 16 to be applied to each area of the panel 13 requiring straightening, as determined by the comparing step 12. The defined parameters may be selected from at least a trajectory, which the straightening tool is intended to follow over the deformation, a lead speed of the straightening tool 46, a position of the straightening tool 46, a laser power, etc. These can be monitored and, when required, adjusted during the straightening process.

To select the proper straightening parameters in the analyzing step 14, the software may use preset values or procedures, whether predefined or not, developed for a specific area. For instance, the intended (i.e. non-deformed) shape of the panel is preprogrammed and, in the comparing step 12, the measurements gathered in the scanning step 10 by the optical sensor 40 are compared with the preprogrammed or preset data of a non-deformed panel.

The computer and software 42 may also act in an intelligent manner, by using an algorithm to calculate the proper path and parameters to correct the measured deformations. Such an algorithm may be defined empirically (by way of prior experiments) or by any other adequate means, such as artificial intelligence or other self-teaching techniques or machine learning techniques.

Figure 2:
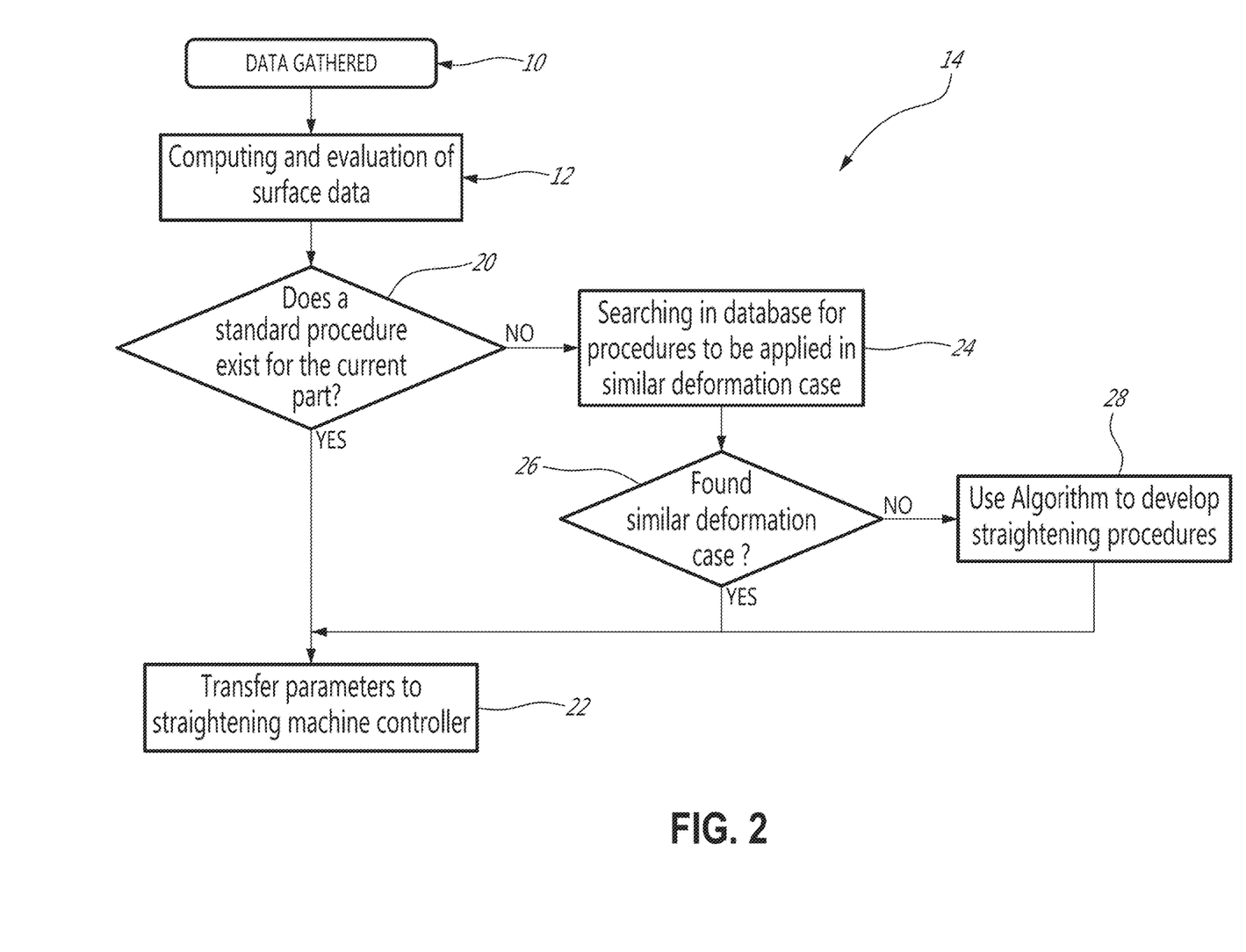
FIG. 2 is a flow chart, which details the third analyzing step of FIG. 1, in accordance with an exemplary embodiment.

FIG. 2 illustrates an example of a flow chart that is used for the analyzing step 14 of FIG. 1. More particularly, once the gathered data of the panel 13 scanned during scanning 10 has been compared with the desired result, the algorithm verifies at 20 if there is a standard corrective procedure for the identified deformation. In the affirmative, the corrective parameters for this deformation are transferred at 22 to an automated straightening controller used during the straightening step 16. In the negative, the database is searched at 24 for known procedures associated with a similar deformation case.

The results of this search are at 26, and if a similar deformation case has been found, then the parameters of this similar deformation case are transferred at 22 to the automated straightening controller. If at 26, no similar deformation case has been identified, an algorithm is used at 28 to develop a new straightening procedure adapted and appropriate for the specific deformation case.

Figure 3:
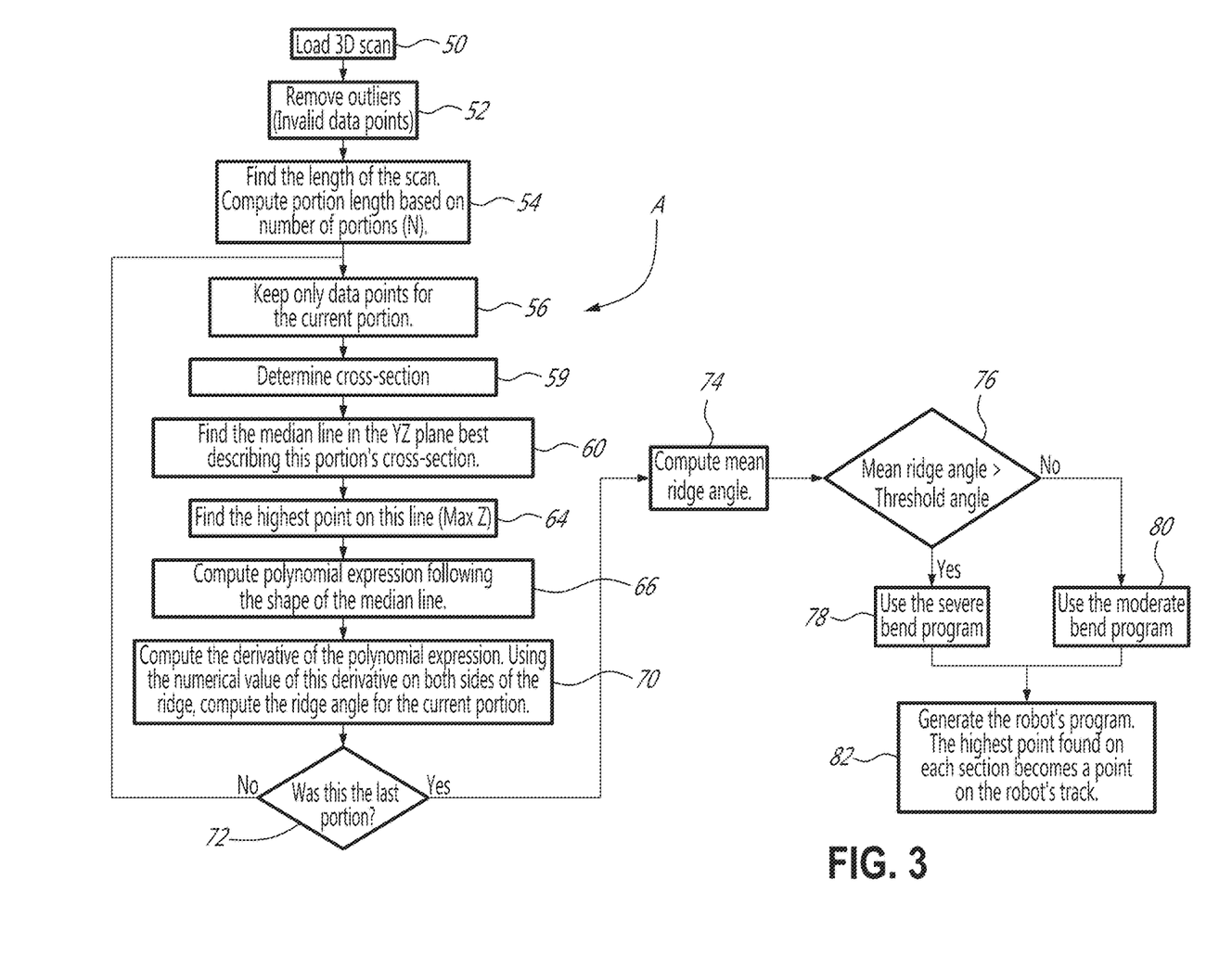
FIG. 3 is a flow chart of an algorithm in accordance with an exemplary embodiment.

A flow chart of an example of an algorithm A used at 28 by the automated straightening controller is shown in FIG. 3. In FIG. 3, the algorithm A looks for the maxima, i.e. the highest deformation points for each portion along the length of the scan. In the present example, the case is simplified as it represents a scanned area of the panel 13 having a single crest.

Figure 4:
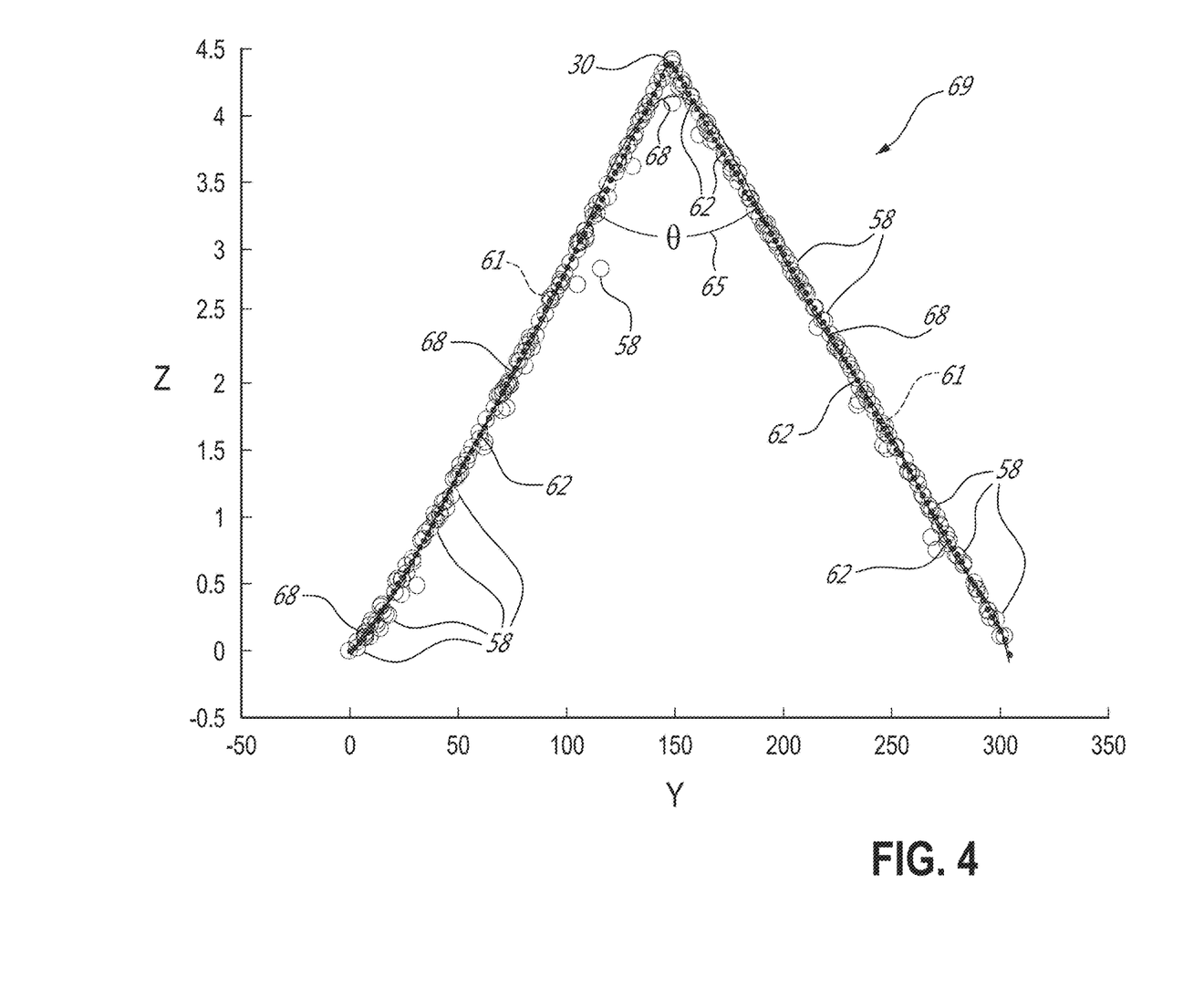
FIG. 4 is a graph showing an example of a portion analysis, in accordance with an exemplary embodiment.
Figure 5:
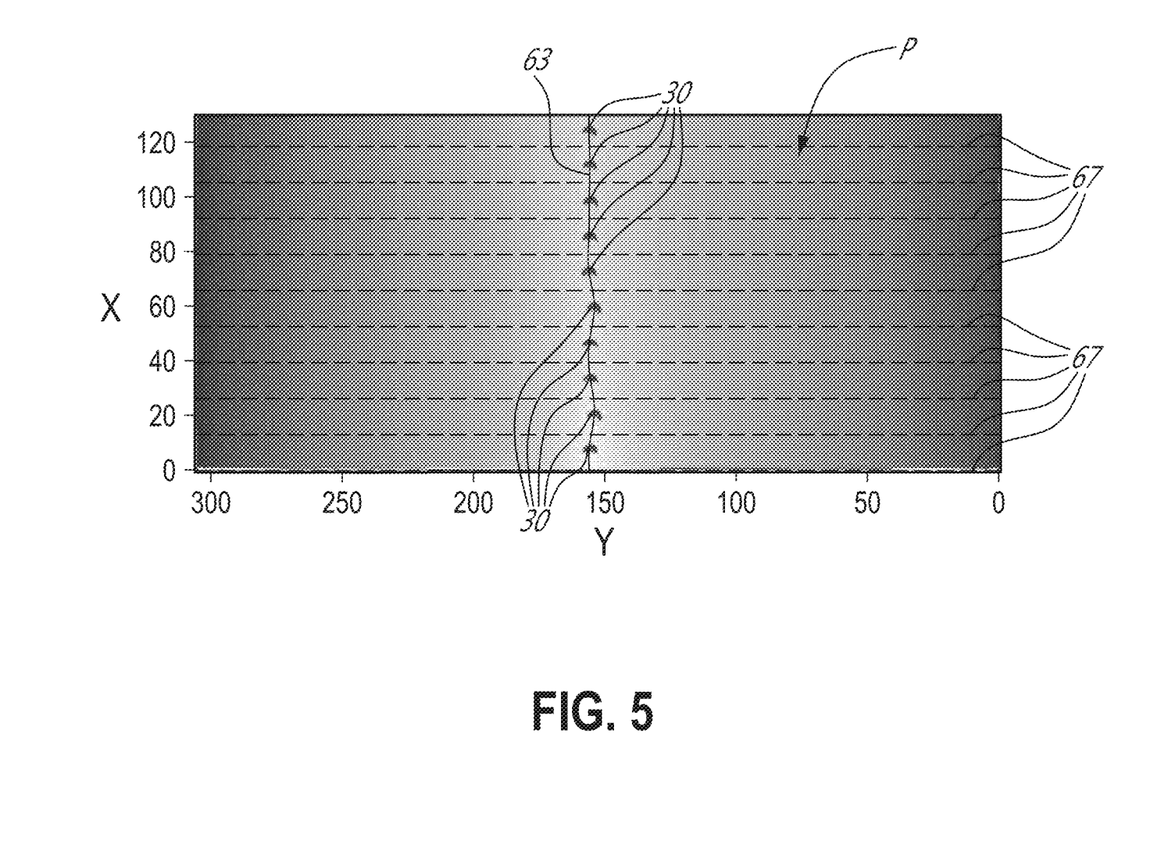
FIG. 5 is a schematic representation showing the highest deformation points for all scanned portions of a panel, in accordance with an exemplary embodiment.

More particularly, the algorithm A first loads at 50 the 3D scan of the panel to straighten, and then removes at 52 data points that are considered invalid. At 54, the algorithm A slices the scanned surface in small strips of a determined width (the width corresponding to the X axis), thereby creating areas, strips or portions 67 of the surface to be analyzed. FIG. 5 depicts the scanned surface and each portion 67 to be analyzed. The width of those portions may vary depending on the required accuracy. At 56, the algorithm A screens the data points and retains only the data points for the current portion. Such data points are shown at 58 in FIG. 4. FIG. 4 illustrates a schematic graph of an exemplary portion analysis, associated with the flow chart of FIG. 3.

For each portion 67, the algorithm A then determines at 59 a cross-section 69 of the portion 67 in the YZ plane using the cloud of data points 62, as shown in FIG. 4. The algorithm A then determines at 60 a median line 61 describing the shape of this cross-section 69. At 64, the algorithm A determines a maximum 30 (the highest point in the Z direction) of the median line 61, and then at 66, the algorithm A computes a polynomial expression that best matches the shape of the median line 61. When plotted, this polynomial expression corresponds to a trend line 6 in FIG. 4.

At 70, the algorithm A computes the derivative of the polynomial expression and, using the numerical values of this derivative on both sides of the maximum 30, the algorithm A computes a ridge angle $\theta$, herein referred to at 65, for the current analyzed portion. At 72, the algorithm A determines if the portion 67 just analyzed is the last portion of the scan to be analyzed; if it is not the last portion, then steps 56, 60, 64, 66 and 70 are repeated. As shown in FIG. 5, once all the cross-sections 69 of all portions 67 to be analyzed have been analyzed, an image of the scanned surface may be created, the maxima 30 representing a plurality of summits making up a ridge line 63, and a mean ridge angle for all portions is computed at 74.

The algorithm A then determines at 76 if the mean ridge angle is above a predetermined threshold angle. If the mean ridge angle is above the threshold angle, the algorithm A selects the severe bend program at 78, whereas if the mean ridge angle is not higher than the threshold angle, the algorithm A selects the moderate bend program at 80. Optionally, more than one threshold could be pre-determined such that this selection would be made from more than two different programs.

The algorithm A then generates at 82 the program for the robot 44, wherein the maximum 30 of the cross-section 69 of each portion 67 becomes a point on the trajectory of the straightening tool. It is however possible that the algorithm A determines that the trajectory of the tool passes next to at least some of the maxima 30, and thus not directly thereon. FIG. 5 exemplifies these maxima 30, the highest deformation points of each determined cross-sections 69 of the scanned portions 67 of the panel 13. Again, the series of maxima 30 define the ridge line 63, which corresponds also to the trajectory of the straightening tool. The various shades of grey in FIG. 5 indicate the level of deformation, corresponding to displacements of the surface of the panel 13 along the Z axis. The darker zones along left and right sides of the panel 13 show a smaller deformation than that of the lighter grey zones appearing in the middle thereof.

The exemplary algorithm A selects a straightening strategy, that is a specific combination of parameters (speed, power, etc.) as a function of the level of deformation detected on the panel 13. In the present example, only two levels of deformation are used: <3 degrees (moderate bend at 80), and >3 degrees (severe bend at 78). To recognize the deformation levels, a data bank of 10 sample measurements (5 per deformation level) was made available to the algorithm A for comparison.

The straightening strategies may be obtained by experimental investigation. These straightening strategies take into consideration temperature limits and heating duration limits associated with the panel 13. These limits are specific to the material and are available from the literature, e.g. encyclopaedias. In the present example, the only parameter being adjusted is the laser power level. Also, in the present example, there is no dwell time in that the laser follows a continuous trajectory, i.e. without stopping, whereas when a flame torch is used to straighten a panel, it is often necessary to leave the flame at a same location for a certain period of time in order to allow it to reach the appropriate temperature for a precise area of the panel.

Finally, the robot 44 executes at the fourth straightening step 16 the operations specified by the automated straightening controller, which uses the software 42, taking into consideration the defined parameters at the analyzing step 14. The operations are contained in the straightening strategy. The robot 44 uses a straightening tool 46 with the defined parameter(s) specified at the analyzing step 14 to conduct the straightening process. The straightening tool 46 may be, but is not restricted to, a laser, an induction machine, or any other adequate device that can heat or induce heat in the panel 13 to be straightened. As shown at 18 in FIG. 1, various controls and adjustments can be provided in the straightening step 16. For instance, a temperature monitoring device may be used during the straightening process to ensure proper heating temperatures. This temperature monitoring device could be, for example, a pyrometer or an infrared camera.

In the present example, applying the straightening strategy is sufficient to straighten to an acceptable level the surface of the panel 13 to be straightened, such that no physical intervention by a constraint mechanism needs to be used.

Economically, both robots 44 and 48 may actually be replaced by a single robot equipped with a tool rack, allowing it to change its own tools. For example, while the straightening tool 46 is used, the optical sensor 40 may be placed in the tool rack and vice versa.

Optionally, the optical measurements could also be conducted almost simultaneously during the straightening process of the straightening step 16. In this case, the single robot 48 holds both the optical sensor 40 and the straightening tool 46. The optical sensor 40 scans the surface of the panel 13 ahead of the straightening tool 46 and sends the scanned data to the controller for analysis at step 12, which defines the required parameters at step 14 and which controls the straightening tool 46 based on those defined parameters. Such a continuous online, or real-time measurement and straightening process may then include a system that is directly adaptive during the straightening process. Such a system may, for example, adapt the straightening parameters depending on the reaction of the treated area in a "live" or real-time manner.

The four steps 10, 12, 14 and 16 may also be conducted iteratively until the desired results are obtained. After straightening, a final scan may be performed in order to provide a final distortion report to workers.

The present method potentially reduces the straightening time, and also reduces the variability related to worker skills and perceptions. Furthermore, the proposed method improves the results and precision of the straightening process. Interestingly, the present straightening process may also contribute to decreasing the weight of a finished vehicle as putty used to even the surface of the external panels of the shell is reduced or even eliminated.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the embodiments and non-limiting, and it will be understood by persons skilled in the art that other variants and modifications may be made without departing from the scope of the embodiments as defined in the claims appended hereto.

The invention claimed is:

1. An automated method for at least partly correcting deformations in a metallic component, the method comprising:
   a) using a sensor, scanning a deformed surface of the metallic component to gather data thereon;
   b) using a software, comparing the gathered data of step a) with a desired result of the metallic component;
   c) performing an analysis of the compared data of step b) for selecting at least one parameter to be used in correcting operations; and
   d) executing on the deformed surface the correcting operations by inducing heat in the deformed surface so as to bring the deformed surface closer to the desired result, the correcting operations using the at least one parameter,
further comprising searching a database for existing procedures to be applied in a deformation case similar to that of the deformed surface of the metallic component,
wherein step c) comprises identifying highest deformation points of the metallic component,
wherein step c) further comprises determining a cross-section of each adjacent portion of the deformed surface of the metallic component and finding a median line substantially describing the cross-section of each adjacent portion of the deformed surface of the metallic component, the at least two highest deformation points lying respectively on at least two adjacent median lines of corresponding at least two adjacent portions of the deformed surface of the metallic component, and
wherein step d) comprises heating the metallic component along a trajectory substantially passing by the at least two of the highest deformation points.

2. The method of claim 1, wherein in step a), the deformed surface is scanned with an optical sensor.

3. The method of claim 1, wherein in step a), the data gathered includes at least one of measures and characterizations of the deformed surface.

4. The method of claim 1, wherein in step c), the analysis is performed using the software.

5. The method claim 1, wherein in step c), the at least one selected parameter is adapted to be applied at each area of the deformed surface requiring correcting.

6. The method of claim 1, wherein in step d), the correcting operations are specified by the software and are based on the at least one parameter selected in step c).

7. The method of claim 1, wherein steps a) and d) are controlled by a controller.

8. The method of claim 7, wherein steps b) and c) are also controlled by the controller.

9. The method of claim 7, wherein in step d), the executing of the correcting operations is performed using a heat-inducing straightening tool, the straightening tool is connected to a robot controlled by the controller, and the controller uses the software.

10. The method of claim 9, wherein step d) is performed without physical contact with the metallic component.

11. The method of claim 10, wherein the straightening tool uses a laser mounted on a robotic arm, the robotic arm being part of the robot.

12. The method of claim 1, wherein the sensor is a 3D laser scanner and wherein step a) is performed using the 3D laser scanner.

13. The method of claim 1, wherein the at least one parameter in step c) is selected from a list consisting of power, time, deformations, trajectory, and temperature.

14. The method of claim 1, wherein the metallic component is a metallic panel.

15. The method of claim 1, wherein step c) further comprises computing one polynomial expression for each median line, the polynomial expressions substantially describing the shape of a respective one of the at least two median lines, step c) further comprising computing a derivative of each polynomial expression and selecting one bending program for each derivative, each bending program being based on one respective derivative.

16. The method of claim 15, wherein each bending program is one of a severe bend program and a moderate bend program.

* * * * *

UNITED STATES PATENT AND TRADEMARK OFFICE
CERTIFICATE OF CORRECTION

PATENT NO. : 10,725,447 B2
APPLICATION NO. : 16/169224
DATED : July 28, 2020
INVENTOR(S) : Gaston Morneau et al.

It is certified that error appears in the above-identified patent and that said Letters Patent is hereby corrected as shown below:

In the Claims

Column 8, Line 17, Claim 5, delete "method" and insert -- method of --

Signed and Sealed this
Eighth Day of December, 2020

Andrei Iancu
*Director of the United States Patent and Trademark Office*